United States Patent [19]
Wenrich et al.

[11] 3,906,328
[45] Sept. 16, 1975

[54] AUTOMATIC POSITIONING MECHANISM

[75] Inventors: Carl M. Wenrich, Shillington; Bryce E. Hoverter, Jr., Reinholds, both of Pa.

[73] Assignee: Teledyne Mid-America Corporation, Los Angeles, Calif.

[22] Filed: Nov. 29, 1973

[21] Appl. No.: 420,167

[52] U.S. Cl. ............... 318/612; 318/379; 318/467
[51] Int. Cl.² .......................................... G05B 5/01
[58] Field of Search ........... 318/467, 466, 612, 379, 318/380, 468

[56] References Cited
UNITED STATES PATENTS

| | | | |
|---|---|---|---|
| 2,961,591 | 11/1960 | Frankel et al. | 318/379 X |
| 3,186,366 | 6/1965 | Haas et al. | 318/468 X |
| 3,352,396 | 11/1967 | Moseley | 318/468 X |
| 3,597,672 | 8/1971 | Scesselberg | 318/380 X |
| 3,757,232 | 9/1973 | Matsuda | 318/467 X |

*Primary Examiner*—B. Dobeck
*Attorney, Agent, or Firm*—Edelson and Udell

[57] ABSTRACT

A positioning mechanism for work utilities including a position sensing synchronizer device for sensing the position of a movable part of the work utility and which controls the driving and braking of a direct current positioning motor coupled to the work utility by controlling the actuation of control relays which themselves control the application of direct current and phase-shifted alternating current to the gate electrodes of solid state rectifiers which are respectively in parallel and series with the motor armature. The phase of the phase-shifted alternating current gate voltage is selectively adjustable to control the conduction angle of the solid state rectifier and provide positioning speed control for a range of power supply voltages. An auxiliary control circuit is provided which functions in conjunction with the position sensing synchronizer device and positioning mechanism to provide automatic control of an auxiliary function at a predetermined time in the positioning cycle.

8 Claims, 7 Drawing Figures

FIG. 3A
+ SYNCHRONIZER INPUT VOLTAGE

FIG. 3B
+ VOLTAGE ACROSS RELAY 52

FIG. 3C
VOLTAGE ACROSS RELAY 54

FIG. 3D
CURRENT THROUGH MOTOR ARMATURE MA

FIG. 4

AUTOMATIC POSITIONING MECHANISM

This invention relates generally to automatic positioning mechanisms for intermittently operated work utilities. In general, the positioning mechanism functions at the termination of the normal intermittent operation of the work utility to cause certain movable parts of the work utility to come to rest in particular desired positions.

This invention is applicable to a wide variety of devices in a number of different fields, as for example in the garment industry in which power sewing machine are widely used. Generally in such applications it is required that the sewing machine be intermittently operated with periods of non-operation affording an opportunity to shift the position of the item being stitched. In such case, it is most desirable that the needle be in its down position so that the work may be readily turned about it. Some times of course it is more desirable that the needle be in the up position so that the work may be readily removed from the sewing machine.

Moreover, other types of auxiliary control are also of interest, with such control sometimes being desired at the end of every operating cycle of the work utility, and in other cases such auxiliary control being only desired upon specific operator initiated action. For example, again related to the sewing trades, it may be desired to cause thread severing or bed dropping to occur at the end of some cycles of operation, but not in all cases. Additionally, it may be necessary to have the specific conditions of the work utility known before the auxiliary control system is activated. Such an auxiliary control system is also of course applicable to other devices such as a variety of machine tool operations.

Automatic positioning mechanisms for relatively movable parts of work utilities are of course known in the art, some utilizing electromechanical actuator devices and some utilizing solid state elements to control the operation of some form of motor device which carries out the positioning function. The apparatus according to the present invention provides faster and more positive braking of the motor device which is operative to effect positioning by the utilization of solid state current conduction devices in circuits involving heavy current flows together with electromechanical relay structures utilized in control curcuits through which only relatively low control currents flow. This combination of elements provides an optimum system through which the operating speed of the positioning mechanism may be controlled, and also provides the ability to maintain positioning speed by compensating for variations in supply voltages.

A principal object of the invention is to provide a work utility automatic positioning mechanism which is inoperative during normal operation of the utility, but which is automatically operative thereafter to move the working parts of the utility to one of several predetermined positions.

Another object of the invention is to provide a novel automatic positioning mechanism as aforesaid which further includes means for carrying out an auxiliary control function during the course of or at the end of the positioning cycle.

A further object of the invention is to provide a novel automatic positioning mechanism as aforesaid which includes means for controllably varying the positioning speed of the mechanism as well as means for rendering positioning speed of the mechanism substantially independent of variation in electrical supply voltages within the range of variations normally encountered in industrial applications.

The foregoing and other objects of the invention will become clear from a reading of the following specification in conjunction with an examination of the appended drawings, wherein:

In the several figures, like elements are denoted by like reference characters.

Turning now to the drawings, and considering first FIG. 1, the apparatus according to the invention is seen to consist of a direct current positioning motor which is to be appropriately coupled to the device to be positioned through any suitable mechanism (not shown), the positioning motor having a field winding MF and an armature MA connected to a source of alternating current 9 by electrical conductors 10 and 11 and through intervening control circuit elements hereinafter described. Also coupled to the work utility by means not shown is a synchronizer device designated generally as 12, the synchronizer being provided with a plurality of rotatable rings 13 through 16 which are respectively electrically engaged by adjustable fixed position brushes 17 through 20. The innermost synchronizer ring 13 is continuously conductive throughout its 360° extent, while the remaining synchronizer rings 14, 15 and 16 each have a conductive section shown in dark line and a non-conductive or barrier section shown in light line. Synchronizer rings 14 and 15 are conductive throughout most of their extent and have relatively short-arc non-conductive segments which latter are positioned substantially diametrically opposite to one another and correspond therefore to diametrically opposite positions of a rotatable element of the work utility to which the synchronizer rings are affixed as a unit. Synchronizer ring 16 differs from rings 14 and 15 in that its electrically conductive arcuate segment is of relatively short length compared to the remainder of ring 16 which is non-conductive. The conductive portions of all of the synchronizer rings 13 through 16 are electrically interconnected by means of a shorting link 21.

The positioning mechanism is so connected to the work utility that movement of the portion of the work utility which is connected to the movable part of the positioning motor, usually the armature MA, produces a related kind of movement at the movable part of the work utility to which the rotatable sychronizer rings are connected. For example, increasing or decreasing positioning motor speed causes corresponding increasing or decreasing speed of movement of the synchronizer rings 13 through 16, irrespective of whether or not the positioning motor speed and synchronizer ring speed are in fact synchronous.

However, the synchronizer rings are necessarily connected to a movable part of the work utility such that the positions of the rings always exactly correspond to specific positions of the part or parts of the work utility which it is desired to positionally control. For example, when the work utility is a sewing machine, the non-conducting segments of synchronizer rings 14 and 15 could correspond to particular positions of the sewing machine needle, as for example an up position and a down position, and in such case, the conductive segment of outer synchronizer ring 16 would always correspond to a third position of the needle which is neither up nor down but at a specific position therebetween.

In a sewing machine mechanism, the synchronizer rings could conveniently be connected to the spindle shaft since the latter performs one complete revolution for each complete reciprocating cycle of the sewing mcahine needle bar to provide an invariant synchronized relationship between movement of the sewing machine needle and the positions of specific parts of the synchronizer rings such as the non-conducting segments of rings 14 and 15 and the conducting segment of ring 16. Automatic positioning is carried out by controlling the running and braking of the DC positioning motor through the synchronizer ring structure in a manner to be described in connection with the showing of FIG. 2. However, additional controlled functions can also be carried out by means of an auxiliary control package designated generally as 22.

The auxiliary control package 22 is provided with six terminals 23 through 28 by means of which the synchronizer 12 and other elements of the circuit to be described determine when the auxiliary control package 22 produces a pre-determined condition at terminals 29 of the control package to thereby actuate an auxiliary device. For example, in the case of a sewing machine, the auxiliary device could be a thread trimming mechanism which it is desired to actuate at the earliest time after the sewing machine needle is stopped in its up position. Other kinds of work utilities could of course require the automatic actuation of different kinds of auxiliary equipment or subsequent stage devices.

Auxiliary control package terminal 23 connects to synchronizer brush 20 through a control line 30. Terminal 24 connects via a control line 31 to the contact of a switch S1 shown in open circuit condition, the pole of the switch S1 being connected to the cathodes of a pair of rectifier diodes D1 and D2 connected in a fullwave rectification circuit to the opposite ends of secondary winding 33 of power transformer 34, the primary winding of which is connected to power source 9. Auxiliary control package terminals 26 and 27 are connected respectively to a pair of control lines 35 and 36 which themselves connect respectively to one end of the coil 37 of a relay 38 and to the contact of a normally open switch S2, the control lines 35 and 36 being shown as short-circuited by a removable shorting link 39. The opposite end of relay coil 37 is connected through a removable shorting link 40 to the control line 31 and the contact of switch S1, while the pole of switch S2 is returned via conductor 41 to the center tap of transformer winding 33. Auxiliary control package terminal 28 is connected to the center tap of transformer winding 33 by means of control line 42 which connects to conductor 41.

Control line 31 also connects via conductor 43 to one pole 44 of relay 38, the pole 44 being normally engaged with contact 45 which is connected to synchronizer brush 19 when the coil 37 of relay 38 is de-energized. A second pole 46 of relay 38 is connected to the lower end of relay 37 and is open-circuited when the relay coil 37 is de-energized. When relay coil 37 becomes energized, the pole 46 transfers to contact 47 and completes a holding current circuit via conductor 48 to the center tap of transformer winding 33. At such time, of course, relay pole 44 transfers from contact 45 to contact 49 and thereby connects synchronizer brush 18 to control line 31 while simultaneously disconnecting synchronizer brush 19 therefrom.

As will be subsequently understood, switch S1 is the master control switch which when open-circuited as shown disables the entire positioning mechanism and auxiliary control package. Switch S1 in operation is normally open while the work utility is being operated, and is automatically closed when operation of the work utility is terminated by the operator. For example, switch S1 could be connected to the treadle of a sewing machine so that when the operator releases the treadle to terminate stitching, switch S1 would automatically close to thereby initiate a positioning cycle. The function of the switch S2 is to energize relay 38 either through the auxiliary control package 22 or directly through switch S2 as desired in order to transfer control of conditions on control line 32 from synchronizer brush 19 to synchronizer brush 18 should that be desired.

Considering first the actuation of an auxiliary control cycle by means of synchronizer 12 and auxiliary control package 22, when switch S1 closes at the termination of the work utility operating cycle, electrical current flows from the fullwave rectified supply previously described, through closed switch S1, over control line 31 to terminal 24 of the auxiliary control package 22 and also downward through conductor 43 to pole 44 of relay 38 and through relay contact 45 to synchronizer brush 19. Since the work utility is still running but is coasting downward in speed, the synchronizer rings are rotating and during the time interval when brush 19 is on the conductive portion of synchronizer ring 15 current flows therethrough to the synchronizer shorting link 21 and consequently to the conductive portions of the other synchronizer rings 13, 14 and 16. Current thus flows through synchronizer ring 13 to brush 17 and outward to control line 32 and contact 25 of the auxiliary control package 22.

Current may also be led from control line 32 downward through conductor 50 to the coil 51 of relay 52 and back to the power supply via conductor 41. Current simultaneously flows through diode D6, resistor R1 and through the parallel arrangement of capacitor C1 and coil 53 of relay 54, energization of relay coil 53 being delayed for a period of time determined by the charging time constant of the resistive capacitive network formed by R1 and C1. Relays 52 and 54 are associated with the control of the positioning motor and will be considered in more detail hereinafter, but for the present, consideration of the auxiliary control package 22 is now continued.

When switch S1 closed, terminals 24 and 28 of the auxiliary control package 22 were connected to the positive and negative terminals of the DC power supply and provide a source of continuous DC power for energizing the circuitry and mechanisms within the control package which require such power. Control line 32 which leads to terminal 25 of the auxiliary control package from brush 17 of the synchronizer has positive voltage on it as long as synchronizer brush 19 is in contact with the conductive portion of synchronizer ring 15, the voltage at terminal 25 being interrupted for the time interval during which the synchronizer brush 19 is in engagement with the non-conductive segment of ring 15. Consequently, a timed pulse condition is presented to terminal 25 once for each revolution of the synchronizer rings and the timing of the pulse is synchronized with the particular position of the work utility such as the needle of the sewing machine. In the illustrated and previously described case, this corresponds to a timed indicator of the down position of the sewing machine needle.

Terminal 25 of the auxiliary control package 22 can also be provided with a timed pulse signal indicative of the up position of the sewing machine by switching the supply power present on control line 31 from synchronizer brush 19 and ring 15 to synchronizer brush 18 and ring 14. This is accomplished merely by momentarily closing switch S2 which energizes relay coil 37 of relay 38 from the power supply through switch S1 and shorting links 39 and 40. This causes the poles 44 and 46 of relay 38 to transfer respectively to contacts 49 and 47. Switch S2 need not be held closed to maintain relay 38 energized because of the holding current circuit provided by relay contact 47 and pole 46.

Control line 30 which connects synchronizer brush 20 with terminal 23 of the auxiliary control package 22 is a second timed event controlled signal line in which the timed signal pulse appears at terminal 23 when the synchronizer ring 16 rotates to the position where its conductive segment contacts the brush 20. For illustrative purposes this is shown as occuring at a time different from the timed indications of the down position and up position of the needle bar and can represent any point whatever in the interval which is desired by the particular application of interest. For example, if it is desired to initiate an event at a pre-determined point in the cycle corresponding to a particular physical positioning of the work utility with respect to a specific state of the work utility, such as a point in the cycle between the needle down and needle up positions of a sewing machine, then it is necessary to not only know when the needle down reference condition occurs but it is also necessary to have an indication thereafter of the occurrence of the desired condition. Such an indicator is of course provided by synchronizer ring 16 and the signal which it generates on control line 30.

In the event that it is desired that the signal pulse indicating the occurrence of the timed event which appears on control line 30 should not be operative to produce a particular result until a pre-selected other condition shall have occurred, such a result can be obtained for example by removing the shorting link 39 so that the switch S2 when closed does not actuate relay 38 independently of the auxiliary control package 22. By way of illustration in the case of a sewing machine operation, it may be desired that the implementation of the controlled event controlled by the signal state at terminals 29 of auxiliary control package 22 shall not occur unless the sewing machine needle is in its up position. Consequently, it is necessary that relay 38 be actuated to cause the timed event control signal on line 32 to be determined by up position ring 14.

With shorting link 39 removed from the circuit, closure of the switch S2 requires that energization of relay coil 37 be accomplished by a current flow through control lines 35 and 36 connected to terminals 26 and 27 of the auxiliary control package. The internal circuitry of the auxiliary control package may then be arranged so that a controlled event at terminals 29 cannot be initiated prior to the establishment of the current flow into the control package through control lines 35 and 36 irrespective of the occurrence of the timed event control signals which cyclically appear on control line 30.

Figure 4:
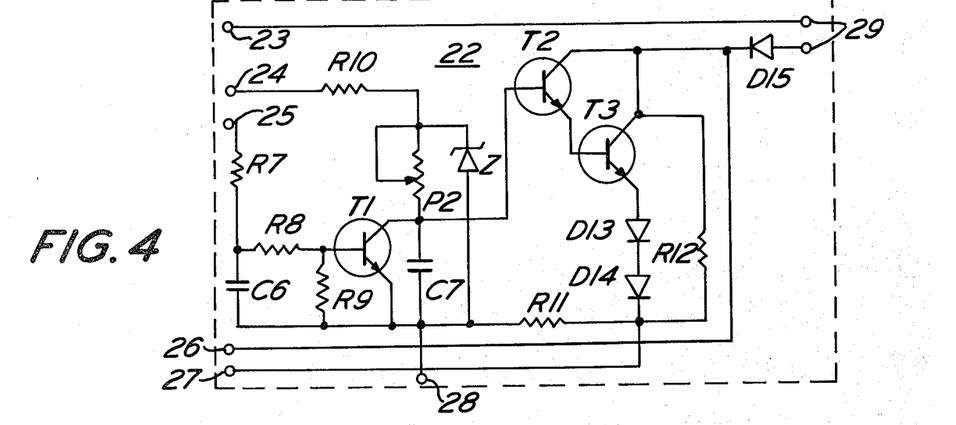
FIG. 4 is a schematic diagram of one possible auxiliary control package circuit usable with the configuration of FIG. 1.

One suitable circuit usable as the auxiliary control package 22 is shown schematically in FIG. 4. This specifically shown circuit configuration is not a part of the present invention and is illustrated only to show one such possible control package. The specific circuit of FIG. 4 constitutes a separate invention which is the subject of a co-pending U.S. patent application of Carl M. Wenrich and Kalambur G. Ramachandran, Ser. No. 417,876, filed Nov. 21, 1973 entitled "Work Utility Stop Signal Circuit" which is assigned to the assignee of the instant application, and in which the operation of the circuit of FIG. 4 is fully described on pages 10 through 17 of the specification. More briefly however, the circuit of FIG. 4 functions as follows.

Figure 3A:
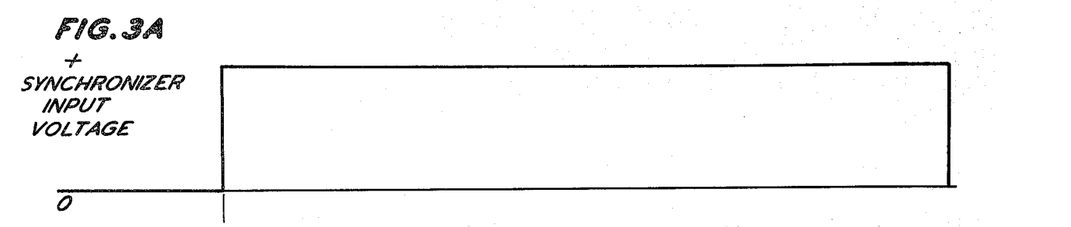
FIGS. 3A through 3D are a series of time related waveforms illustrating the electrical conditions at different points in the circuit during the course of the positioning cycle.
Figure 3B:
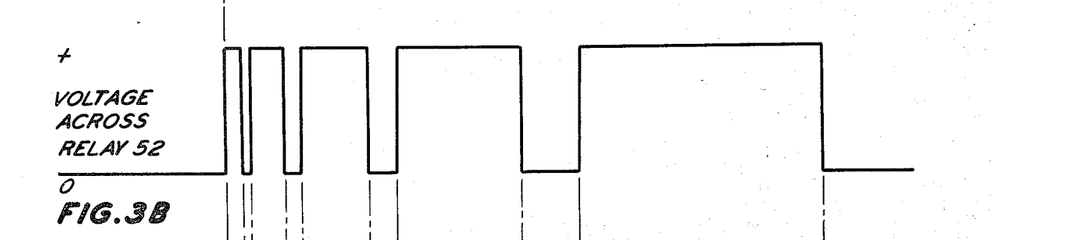

It is possible to detect the speed and deceleration of the machine during any cycle from the pulses shown in FIG. 3B, and the time that the needle spends in the down position for a given system can also be detected. It has been found statistically that the needle spends less than a particular time interval in the down position if the machine is not at the verge of stopping. In other words, if the needle spends more than a particular time interval in the down position then the machine is either in its last cycle or is about to stop. Of course, while the time intervals vary with the machine speed, the circuit detects when the machine spends more than a selected "time down" interval in the down position, and immediately gives an electrical signal called hereinafter the critical voltage V, and it is possible to set the circuit to detect different selected time down values for different system set-ups.

Each pulse at terminal 25 is reduced in amplitude to a few volts, filtered by the network of R7, C6, R8, R9 and applied to the base-emitter elecrodes of transistor T1. These positive-going pulses turn on transistor T1 which thereby completely discharges capacitor C7. When the pulses drop to the zero level transistor T1 is cut-off and capacitor C7 charges. The charging time of C7 is thus controlled by the length of time that T1 remains cut-off, so that as T1 remains cut-off for successively longer times C7 charges to successively higher voltage levels. The rate of charge of C7 is determined by the time constant P2C7 which is controllable by movement of the arm of potentiometer P2, and consequently, the length of time required for C7 to charge to the critical voltage V is settable by P2 to be just slightly longer than the time down interval so that when the critical voltage V is reached it is known that the work utility is about to stop or has just stopped.

Figures 3C, 3D:
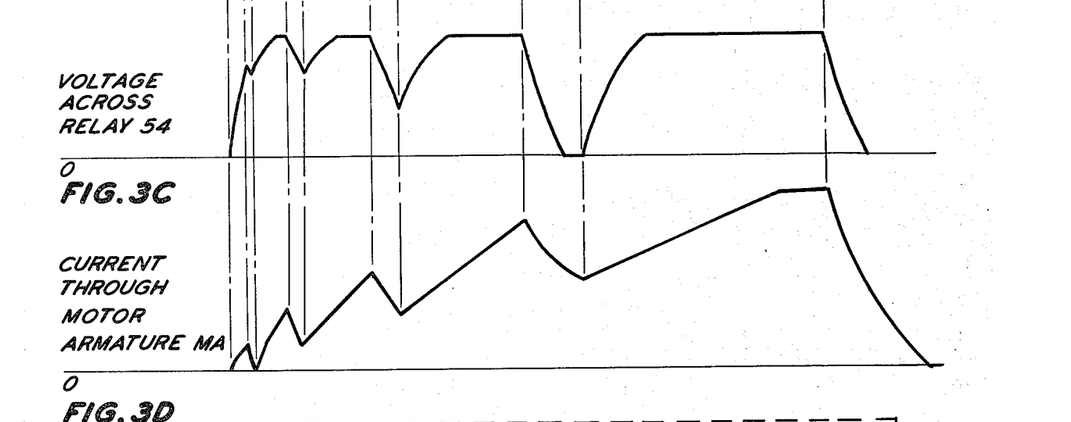

The critical voltage V is that voltage sufficient to overcome the cut-off bias provided to the Darlington circuit T2T3 by series diodes D13 and D14 and thereby turn on T2T3 resulting in sharp pull-down of the potential at the junction of T2 and T3 collector electrodes and the cathode of diode D15 as shown at the right hand end of FIG. 3C. Turn-on can only occur when the cathode end of D14 is connected to the DC power supply return line 41 by the closure of switch S2. The turn-on current T2T3 is supplied by C7, and the voltage on capacitor C7 is held at the critical voltage V with the bias current being supplied from the zener controlled positive terminal of the DC power source.

With D15 clamped low by T2T3, the terminal 29 connected to the anode of D15 is also clamped low. Consequently, when the other terminal 29 which is connected to terminal 23 goes high in potential because of contact between brush 20 and the conductive segment of synchronizer ring 16, an output pulse appears at terminals 29. It is this output pulse which is the stop signal circuit output pulse utilized to actuate the auxiliary operation device such as a thread trimmer or bed drop mechanism.

Synchronizer ring 16 and brush 20 may be so oriented with respect to ring 14 and brush 18 that brush 20 passes out of contact with the conductive segment of ring 14 before a complete stop occurs in which case the output pulse will be of finite duration and will terminate. On the other hand, if brush 18 does not pass out of contact with the conductive segment of ring 14 before a complete stop occurs then the output pulse will constitute a step function that terminates when the synchronizer input voltage, as shown in FIG. 3A, returns to zero level upon the opening of switch S1.

The generation of the output pulse just described was predicated upon closure of switch S2 to connect the cathode of bias diode D14 to the negative side of the direct current supply. Closure of switch S2 is necessary to cause up positioning of the sewing machine needle, and it is apparent as previously discussed, that thread trimming for example cannot be carried out with the needle in its down position. Accordingly, unless up positioning of the needle is effected, no pulse can be generated at terminals 29. This lockout system functions as follows.

As shown, pole 44 of relay 38 normally connects the direct current supply through switch S1 to the down position synchronizer brush 19 and ring 15 so that normally the machine will stop with the needle in the down position under control of the positioning mechanism. Additionally, stop signal circuit 22 produces a critical voltage V across capacitor C7 when the machine is just about to stop in the down position, and this voltage V attempts to turn on the Darlington circuit of T2T3. It cannot however do so because the voltage across C7 is much lower than the effective bias between the base of T2 and emitter of T3. This results from the fact that closure of switch S1 also causes a very small current to flow through link 40, coil 37 of relay 38, conductor 35, resistors R12 and R11 back to the negative return of the direct current supply through conductors 42 and 41.

Resistor R11 is chosen to be much larger than resistor R12, perhaps on the order of 100 times larger. Resistor R12 is of sufficient absolute resistance to prevent pull-in of relay 38. Consequently, the T2T3 circuit is biased strongly into non-conduction by substantially the full direct current supply voltage, and C7 is incapable of developing sufficient voltage under any circumstances to overcome this bias. The cathode of diode D15 is therefore substantially at the + direct current supply voltage so that when a pulse of the same magnitude appears at synchronizer brush 20, there is no effective difference of potential at terminals 29 so that no output pulse can ever occur.

From the foregoing it is observed that this state of affairs is due directly to the presence of bias resistor R11 which locks out the Darlington circuit by interposition between the cathode of diode D14 and the negative return line 42 of the DC power supply. Switch S2 is shunted across resistor R11 so that when closed effectively short-circuits R11 and connects D14 directly to the negative return line 41. This immediately reduces the bias on T2T3 to that of the forward potential drops across D13 and D14 so that if the machine is about to stop, the critical voltage V will have been developed across C7, and T2T3 will conduct strongly and energize relay coil 37. Energization of relay coil 37 drops most of the supply voltage across the coil and sharply pulls down the cathode of diode D15 as previously described while also causing transfer of relay pole 44 to the up position synchronizer brush 18 and ring 14, and transfer of pole 46 to complete the holding current circuit for relay coil 37. With the cathode of diode D15 pulled down, the output pulse is generated during the up positioning cycle by synchronizer ring 16.

If at the time switch S2 closes, the machine is not about to stop, then the critical voltage V will not be present on C7 and T2T3 cannot be turned on so that relay coil 37 cannot be energized due to resistor R12, and up positioning movement cannot be initiated. Up positioning movement can only be initiated after the stop signal circuit has determined that the machine is about to stop in its down position. Consequently, up positioning is automatically effected at the earliest possible time and auxiliary operation is actuated immediately.

Figure 1:
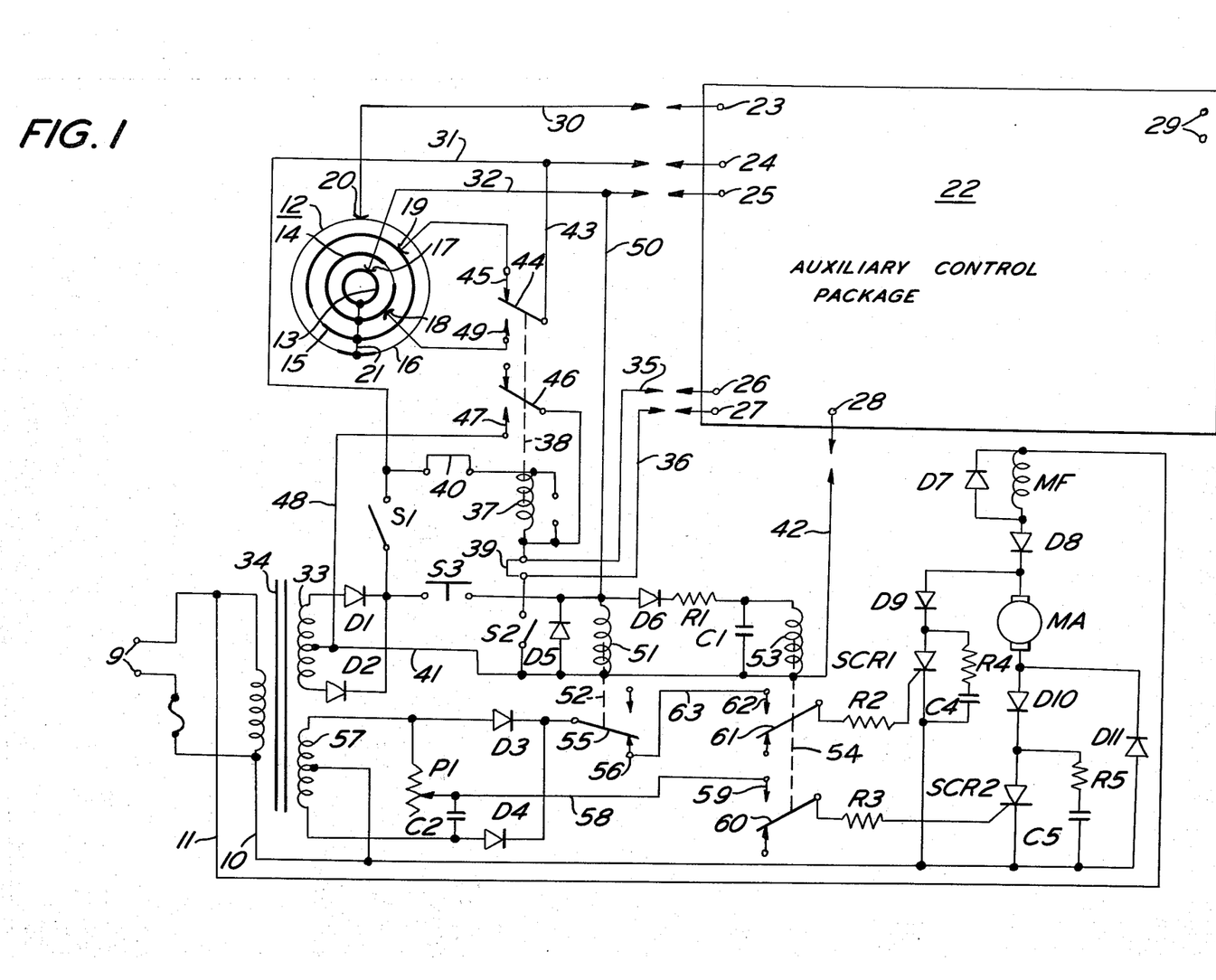
FIG. 1 is a generalized schematic diagram of the apparatus according to the invention.
Figure 2:
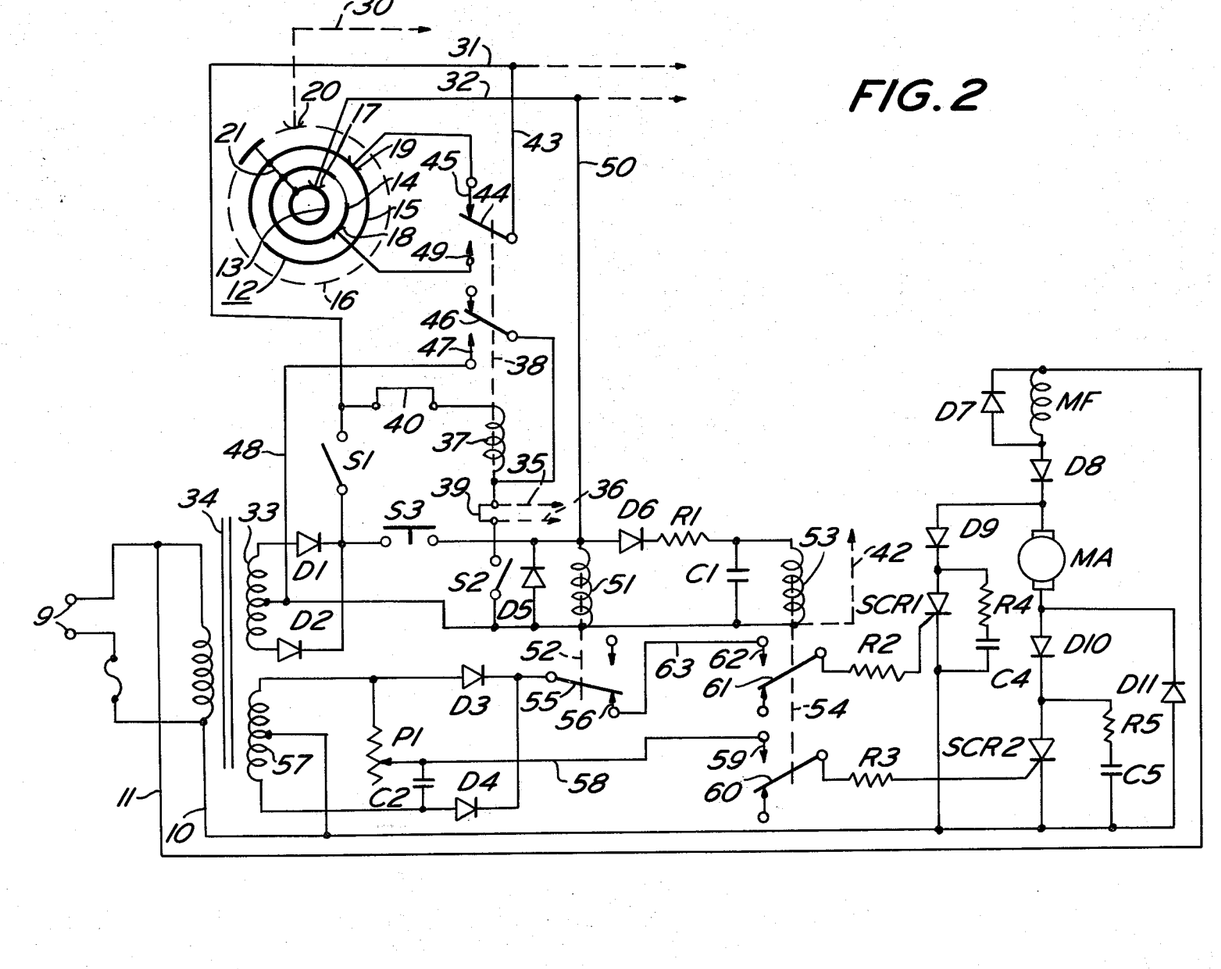
FIG. 2 is a schematic diagram of the apparatus according to the invention showing specific application to a positioning mechanism without the auxiliary control package shown in FIG. 1.

Turning now to a consideration of FIG. 2, it is observed that FIG. 2 is the same as FIG. 1 excepting that the auxiliary control package 22 has been dispensed with together with synchronizer ring 16, its associated brush 20 and timed event control signal line 30. The foregoing elements are not shown in FIG. 2 because they are not involved in the operation of the automatic positioning mechanism. As shown in FIG. 2, and as previously described, when the switch S1 closes at the termination of the work utility operating cycle, current flows from the power supply through lines 31 and 43, relay pole 44 and contact 45 to synchronizer brush 19, through synchronizer ring 15 and shorting link 21 to synchronizer ring 13, through brush 17, line 32 and conductor 50 to energize relay coils 51 and 53 of relays 52 and 54 respectively. Relay coil 51 is shunted by a diode D5 which supresses the reverse voltage spike generated by the relay coil when it is deenergized.

Relay 52 is provided with a single pole 55 which latter is normally engaged with contact 56 when the relay is de-energized. The pole 55 of relay 52 is connected to the positive direct current output of the fullwave rectifier circuit formed by diodes D3 and D4 which are connected to winding 57 of transformer 34. Also connected across transformer winding 57 is a phase shift network consisting of potentiometer P1 and capacitor C2, with the phase-shifted alternating current appearing at the junction of the series resistor-capacitor network and which junction is connected by conductor 58 to a normally open contact 59 of relay 54 associated with pole 60 of that same relay. Relay 54 is provided with a second pole 61 which, when the relay is de-energized, is disengaged from relay contact 62 which latter is connected by conductor 63 to contact 56 of relay 52.

Pole 61 of relay 54 is connected through a current limiting resistor R2 to the gate electrode of a silicon controlled rectifier SCR1 the cathode of which is connected by conductor 10 to one side of the high voltage alternating current power supply and the anode of which is connected through diode D9 to one end of the positioning motor armature. A series resistive-capacitive network consisting of the resistor R4 and capacitor C4 is shunted across the anode and cathode of SCR1 to prevent the DV/dt rating of the SCR from being exceeded by voltage spikes generated by the motor armature MA or by voltage spikes on the 220 volt AC supply line which can, in the absence of the snubbing circuit R4C4, cause turn-on of the SCR without a gating signal being present.

The end of the motor armature MA not connected to the anode of diode D9 is connected to the same AC supply line 10 as is the cathode of SCR1 through the series connection of a diode D10 and a second silicon controlled rectifier SCR2, both the diode D10 and SCR2 being shunted by a reversely poled diode D11. A snubber circuit consisting of resistor R5 and capacitor C5 is shunted across SCR2 and functions in the same manner as the network R4C4 previously described. The control gate of SCR2 is connected through a current limiting resistor R3 to pole 60 of relay 54. The motor armature and diode D9 are connected to the opposite side 11 of the AC supply line through a diode D8 and motor field MF, which latter is shunted by diode D7 functioning as a reverse voltage spike suppressor similarly to diode D5 previously described.

The running and braking of the positioning motor is controlled by turn-on and turn-off of the silicon controlled rectifiers SCR1 and SCR2 by the direct current and phase-shifted alternating current provided by transformer winding 57 through the poles and contacts of relays 52 and 54. When switch S1 closed, relay coil 51 was energized through the synchronizer 12 as previously described and transfers its poles 55 to disengage from contact 56 and thereby de-energize contact 62 of relay 54.

Poles 60 and 61 of relay 54 do not immediately transfer but are delayed and operate only after pole 55 of relay 52 has open-circuited contact 56. This occurs due to the time constant charging circuit R1C1 associated with coil 53 of relay 54. Consequently, the pull-in of relay 54 is delayed so that when poles 60 and 61 do transfer to contacts 59 and 62, there is no voltage at contact 62 and connsequently the control gate of SCR1 receives no gating voltage and SCR1 remains in its off of non-conducting state. However, the phase-shifted alternating current at the junction of variable resistor P1 and capacitor C2 is conducted to the gate of SCR2 through contact 59 and pole 60 of relay 54, and, at a time on the alternating current power waveform determined by the particular phase shift caused by the P1C2 phase shifter, SCR2 is turned on and current flows through the motor field coil MF, diode D8, motor armature MA, diode D10 and SCR2 to start the positioning motor and cause it to drive the work utility. This continues so long as synchronizer brush 19 is in contact with the conductive portion of synchronizer ring 15.

As soon as the brush loses contact with the conductive portion of the ring and engages the insulating barrier segment, the energizing supply voltage to coils 51 and 53 of relays 52 and 54 is interrupted, and relay 52 immediately de-energizes and transfers its pole 55 into engagement with contact 56. Relay 54 does not however drop out because the charge on capacitor C1 discharges through relay coil 53 maintaining it energized for a short time interval. Diode D6 in series with resistor R1 prevents capacitor C1 from also discharging back through relay coil 51. With pole 61 of relay 54 still maintained in contact with relay contact 62, gating voltage is applied to SCR1 causing it to turn on and provide a reverse current short-circuit path with diodes D9 and D11 through the motor armature MA, resulting in rapid dynamic braking of the positioning motor.

Since the work utility during this first cycle of the positioning motor is still running at a relatively high speed, the non-conducting segment of synchronizer ring 15 quickly passes the brush 19 which latter is then again contacted by the conductive portion of the synchronizer ring to again energize relay coil 51 and transfer relay pole 55 to disengage contact 56 and cut off the gating voltage to SCR1 to thereby turn off SCR1 and remove the short circuit from the motor armature. Relay 54 remained pulled-in because of the discharging current of capacitor C1 through relay coil 53 during the time interval when there was no voltage applied to the relay 54 from the synchronizer, so that poles 60 and 61 did not drop out of engagement with their associated contacts 59 and 62. Consequently, SCR2 cycled on and off in accordance with the polarity of the gating voltage and maintains SCR2 conducting to start the positioning motor again as soon as relay 52 has been energized.

The rotational speed of the work utility, and hence the synchronizer rings, is being quickly reduced so that the time periods of both conduction and non-conduction through the synchronizer are increasing with each rotation of the synchronizer. This condition is shown in the waveforms of FIG. 3 to which attention should be directed. FIG. 3A shows the synchronizer input voltage as determined by the condition of switch S1. When the switch is open during operation of the work utility the voltage is at zero level, and when switch S1 closes at the end of operation of the work utility the synchronizer input voltage rises to the + level illustrated and remains there continuously until such later time as switch S1 is again opened by reactivation of the work utility, as illustrated at the right hand end of FIG. 3A.

FIG. 3B illustrates the voltage across the coil 51 of relay 52 and corresponds to the voltage appearing at brush 17 of the synchronizer which is in contact with the completely conductive synchronizer ring 13. Since it was assumed as an initial condition that the synchronizer brush 19 was engaged with a conductive portion of synchronizer ring 15 when switch S1 closed, the voltage appearing at relay coil 51 immediately rises to the + synchronizer input level and remains there for the interval shown until the barrier portion of the synchronizer ring is reached. When the barrier portion is reached the voltage is of course interrupted and drops to zero level, remaining there for the time interval of the transit of the barrier portion past the brush 19 and then rises again to the positive level. As the synchronizer slows down due to the action of the positioning motor, the time length of each succeeding cycle of conduction and non-conduction through the synchronizer increases in length as is shown in FIG. 3B until the work utility comes to a complete stop with the synchronizer brush resting on the non-conducting barrier strip so that the voltage across relay coil 51 drops to and remains at the zero level as shown.

FIG. 3C illustrates the voltage across the coil 53 of relay 54 due to the action of the time constant circuit R1C1. As seen, relay 54 does not drop out for several cycles because the discharge of capacitor C1 holds the relay coil 53 energized for the short time interval during which the supply voltage is cut off when the synchronizer is rotating at high speed. This condition of course changes as the synchronizer slows down and eventually a point in time occurs when both relays 52 and 54 will drop out during the cycling action of the synchronizer controlled positioning motor, as is illustrated by the waveform of FIG. 3C.

FIG. 3D illustrates the running current (not the short-circuit dynamic braking current) through the armature MA of the positioning motor. Diode D8 shown in series with the motor field and armature functions as a blocking diode to prevent an effective short-circuit of the power source 9 through the diodes D7 and D11 together with the armature MA when power source supply line 11 goes negative with respect to line 10. Diodes D9 and D10 in series with the silicon controlled rectifiers are turn-off diodes which function during dynamic braking to insure that SCR1 and SCR2 are completely turned off when the power source voltage goes to zero or becomes negative.

The bias circuit for SCR2 formed by potentiometer P1 and capacitor C2 permits adjustment of the speed of the positioning motor by controlling the conduction angle of the forward current through the motor since the phase of the signal on the gate of SCR2 with respect to the power waveform across the anode to cathode of the SCR determines the conduction angle of the SCR, and hence the magnitude and duration of the current through the motor. Adjustment of the phase control potentiometer P1 permits compensation for different supply voltage conditions encountered in various locations so that a desired positioning speed is obtainable irrespective of such local supply voltage variations. Moreover, for any given supply voltage condition, positioning speed is controllable within a wide range by controlling the SCR conduction angle with the phase shift network.

If it is desired to stop the work utility in the second position as determined by synchronizer ring 14 and brush 18, it is only necessary, as previously explained to close switch S2 to thereby transfer the poles of relay 38 and cause positioning to occur in accordance with the location of the non-conductive segment of synchronizer ring 14. The waveforms of FIG. 3 would of course be identical irrespective of just precisely where the work utility is stopped.

An inching switch S3 is also provided which, as shown, is in a normally open condition. Momentary closure of the switch S3 energizes relay coils 51 and 53 directly from the DC power supply and by-passes the synchronizer. By momentarily depressing switch S3 and releasing it, the positioning motor is activated and will consequently turn the synchronizer so that the operative brush moves off of the barrier portion and onto the conductive portion of its associated synchronizer ring. The motor will then continue to turn under control of the synchronizer until it comes to the next barrier portion and will then stop the work utility.

Having now described out invention in connection with a particularly illustrated embodiment thereof, it will be understood that variations and modifications of our invention may now occur from time to time to those persons normally skilled in the art without departing from the essential scope or spirit of the invention, and accordingly it is intended to claim the same broadly as well as specifically as indicated by the appended claims.

What is claimed is:

1. An automatic positioning mechanism for use in conjunction with a work utility having first and second relatively movable members so related that particular positions of said first member always correspond to particular positions of said second member, the combination comprising,
   a. sensing means associated with said first member for sensing at least one predetermined position thereof when so associated,
   b. drive means couplable to said first member for driving the same to said at least one predetermined position including a direct current motor having a field winding and an armature winding,
   c. motor energizing means including means for coupling said motor windings to a source of AC power, and a first gated rectifier having its anode-cathode current flow path in series electrical circuit with said motor armature and having a gate electrode,
   d. motor braking means including a second gated rectifier having its anode-cathode current flow path in parallel electrical circuit with said motor armature and having a gate electrode,
   e. first control means coupled to said sensing means effective responsive to a first sensed condition of said sensing means indicative that said first member is not at said predetermined position to couple said gate electrode of said first gated rectifier to a source of AC power to turn on said rectifier and cause running current to flow through said motor to cause said motor to drive said first member to the said sensible predetermined position whenever said first sensed condition of said sensing means exists,
   f. second control means coupled to said sensing means effective responsive to a second sensed condition of said sensing means indicative that said first member is at said predetermined position to couple said gate electrode of said second gated rectifier to a gating voltage to turn on said rectifier and cause a short-circuit reverse current flow through said armature winding to dynamically brake said motor for at least a part of the time during which said second sensed condition of said sensing means exists, whereby, said first membr is alternately driven and braked by said drive means until stopped at said predetermined position.

2. A positioning mechanism as set forth in claim 1 wherein said motor field and armature windings are connected in series circuit and said second gated rectifier is in parallel electrical circuit with the series circuit of said motor armature and first gated rectifier.

3. A positioning mechanism as set forth in claim 1 wherein said source of AC power couplable by said first control means to said first gated rectifier gate electrode is derived from the source of AC power for driving said direct current motor and comprises a selectively variable phase shift network effective to shift the phase between the AC power for driving said motor and the AC power to said gate electrode to thereby control the conduction angle of said first gated rectifier and the power to said motor.

4. A positioning mechanism as set forth in claim 1 wherein said motor field and armature windings are connected in series circuit and said second gated rectifier is in parallel electrical circuit with the series circuit of said motor armature and first gated rectifier and further including a unidirectional current conductive device connected in parallel with the anode and cathode of said first gated rectifier and reversely poled with respect thereto to complete the short-circuit current flow path through said armature.

5. A positioning mechanism as set forth in claim 1 further including disabling means selectively operable to disable said sensing means and prevent said first and second control means from driving and braking said direct current motor.

6. A positioning mechanism as set forth in claim 1 wherein said sensing means includes plural means for sensing a plurality of different predetermined positions, each of said plural means being characterized by first and second sensible conditions as aforesaid, and selection means operative to select which of said sensing means plural means is coupled to said first and second control means.

7. A timed-event control device for use in conjunction with a work utility having first and second relatively movable members so related that particular positions of said first member always correspond to particular positions of said second member, comprising in combination, a. first and second sensing means associated with said first member for sensing first and second predetermined positions thereof when so associated and respectively generating first and second sensing signals when said first and second predetermined positions are sensed, b. an automatic positioning mechanism couplable to said work utility effective to move said first member to the said first predetermined position under control of said first sensing means by driving said first member when said first sensing signal is not sensed and by braking said first member when said first sensing signal is sensed, c. an auxiliary control package having a plurality of input terminals and a pair of output terminals, said first and second sensing means being coupled respectively to first and second ones of said input terminals, said control package causing an output signal to be generated at said output terminals when said positioning mechanism moves said first member to cause said first and second sensing signals to be sequentially received respectively at said first and second input terminals.

8. A timed-event control device as described in claim 7 further including selectively actuatable lockout means coupled to said sensing means and to said auxiliary control package effective to prevent generation of said output signal by said first and second sensing signals until after said lockout means has been actuated.

* * * * *